United States Patent
Chen et al.

(10) Patent No.: US 12,444,232 B2
(45) Date of Patent: Oct. 14, 2025

(54) IMAGE PROCESSING METHOD AND ELECTRONIC DEVICE

(71) Applicants: Inventec (Pudong) Technology Corporation, Shanghai (CN); INVENTEC CORPORATION, Taipei (TW)

(72) Inventors: Trista Pei-Chun Chen, Taipei (TW); Chia-Ching Lin, Taipei (TW); Ke-Min Hu, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 376 days.

(21) Appl. No.: 18/173,755

(22) Filed: Feb. 23, 2023

(65) Prior Publication Data

US 2024/0144718 A1    May 2, 2024

(30) Foreign Application Priority Data

Oct. 28, 2022 (CN) .......................... 202211340358.X

(51) Int. Cl.
*G06K 9/00* (2022.01)
*G06F 3/14* (2006.01)
(Continued)

(52) U.S. Cl.
CPC .............. *G06V 40/171* (2022.01); *G06F 3/14* (2013.01); *G06T 7/60* (2013.01); *G06T 7/73* (2017.01);
(Continued)

(58) Field of Classification Search
CPC .............. G06V 40/171; G06V 10/761; G06V 40/193; G06T 7/60; G06T 7/73;
(Continued)

(56) References Cited

U.S. PATENT DOCUMENTS

| | | | |
|---|---|---|---|
| 7,705,877 B2 * | 4/2010 | Jackson | .............. G06T 15/02 348/128 |
| 10,777,018 B2 * | 9/2020 | Varady | ................ G06T 19/20 |
| 11,748,845 B2 * | 9/2023 | Zingade | ............. G06V 20/40 345/671 |

(Continued)

FOREIGN PATENT DOCUMENTS

| | | | | |
|---|---|---|---|---|
| EP | 1496466 A2 * | 1/2005 | ........ | G06K 9/00281 |
| WO | WO-2021185758 A1 * | 9/2021 | ........... | A61B 3/11 |

OTHER PUBLICATIONS

Evaluating effects of focal length and viewing angle in a comparison of recent face landmark and alignment methods, Xiang Li et al., Springer, 2021, pp. 1-18 (Year: 2021).*
Head Pose Estimation in Computer Vision: a Survey, Erik Murphy-Chutorian et al. IEEE, 2009, pp. 607-626 (Year: 2009).*

*Primary Examiner* — Jayesh A Patel
(74) *Attorney, Agent, or Firm* — CKC & Partners Co., LLC

(57) ABSTRACT

An image processing method includes the following steps. A plurality of facial landmarks of a face frame are analyzed. A feature width is calculated according to the facial landmarks, and a head pose is analyzed according to the facial landmarks. The head pose is utilized to update the feature width to generate an updated width. A scale ratio of the updated width to an initial width is calculated. An object distance of a virtual camera is controlled according to the scale ratio. A two-dimensional image is captured from a virtual scene according to the object distance of the virtual camera.

10 Claims, 14 Drawing Sheets

(51) Int. Cl.
*G06T 7/60* (2017.01)
*G06T 7/73* (2017.01)
*G06T 17/00* (2006.01)
*G06V 10/74* (2022.01)
*G06V 40/16* (2022.01)
*G06V 40/18* (2022.01)

(52) U.S. Cl.
CPC ............ *G06T 17/00* (2013.01); *G06V 10/761* (2022.01); *G06V 40/193* (2022.01); *G06T 2207/30201* (2013.01)

(58) Field of Classification Search
CPC ........... G06T 17/00; G06T 2207/30201; G06T 7/70; G06T 11/001; G06T 2207/20081; G06T 2207/20084
See application file for complete search history.

(56) References Cited

U.S. PATENT DOCUMENTS

| | | | |
|---|---|---|---|
| 12,008,464 B2* | 6/2024 | Li | G06V 10/82 |
| 2010/0135580 A1* | 6/2010 | Liu | G06V 40/168 |
| | | | 382/195 |
| 2018/0158246 A1* | 6/2018 | Grau | G06T 3/18 |
| 2018/0197324 A1* | 7/2018 | Hanamoto | G06T 7/70 |
| 2018/0336737 A1* | 11/2018 | Varady | G06T 7/50 |
| 2019/0005306 A1* | 1/2019 | Wu | G06T 19/00 |
| 2019/0075418 A1* | 3/2019 | Shi | H04S 7/303 |
| 2019/0342497 A1* | 11/2019 | Liang | H04N 23/611 |
| 2020/0272806 A1* | 8/2020 | Walker | G06V 40/167 |
| 2021/0090608 A1* | 3/2021 | Zhang | G08B 13/19602 |
| 2022/0075994 A1* | 3/2022 | Shapira | G06N 3/08 |
| 2023/0274453 A1* | 8/2023 | Tang | G06V 40/166 |
| | | | 348/42 |

* cited by examiner

| layer | size | number of kernels |
|---|---|---|
| conv_1 | 3*3 | 32 |
| pool_1 | 3*3 | |
| conv_2 | 3*3 | 64 |
| conv_3 | 3*3 | 64 |
| pool_2 | 3*3 | |
| conv_4 | 3*3 | 64 |
| conv_5 | 3*3 | 64 |
| pool_3 | 3*3 | |
| conv_6 | 3*3 | 128 |
| conv_7 | 3*3 | 128 |
| pool_4 | 3*3 | |
| conv_8 | 3*3 | 256 |
| dense_1 | | 1024 |
| dense_2 | | 136 |

FPs

HP

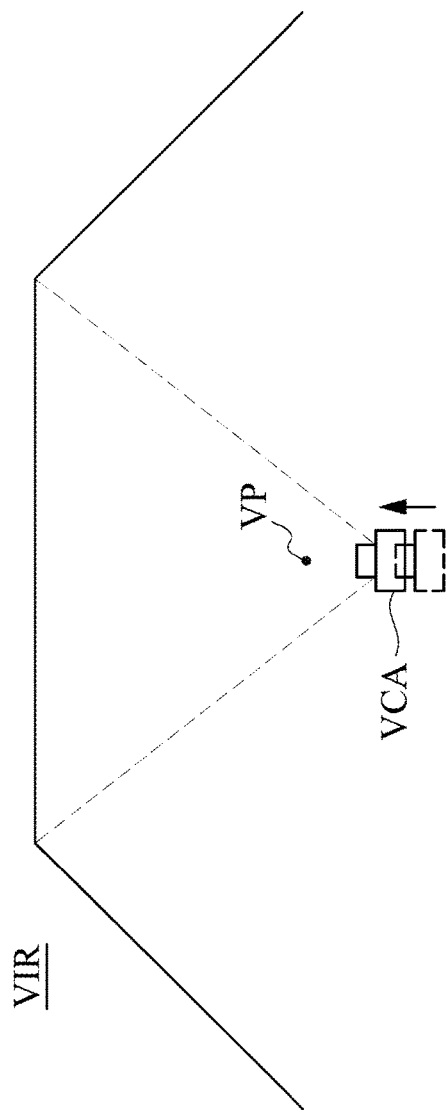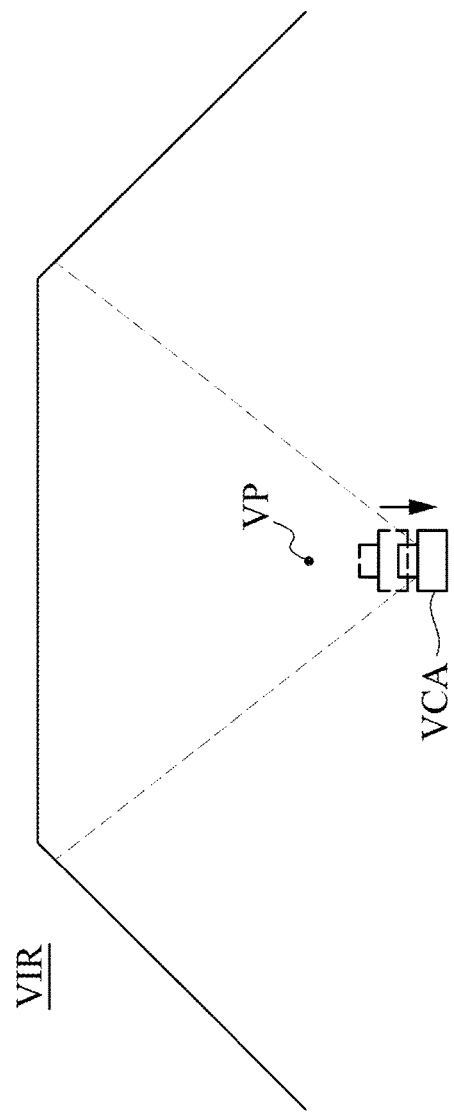

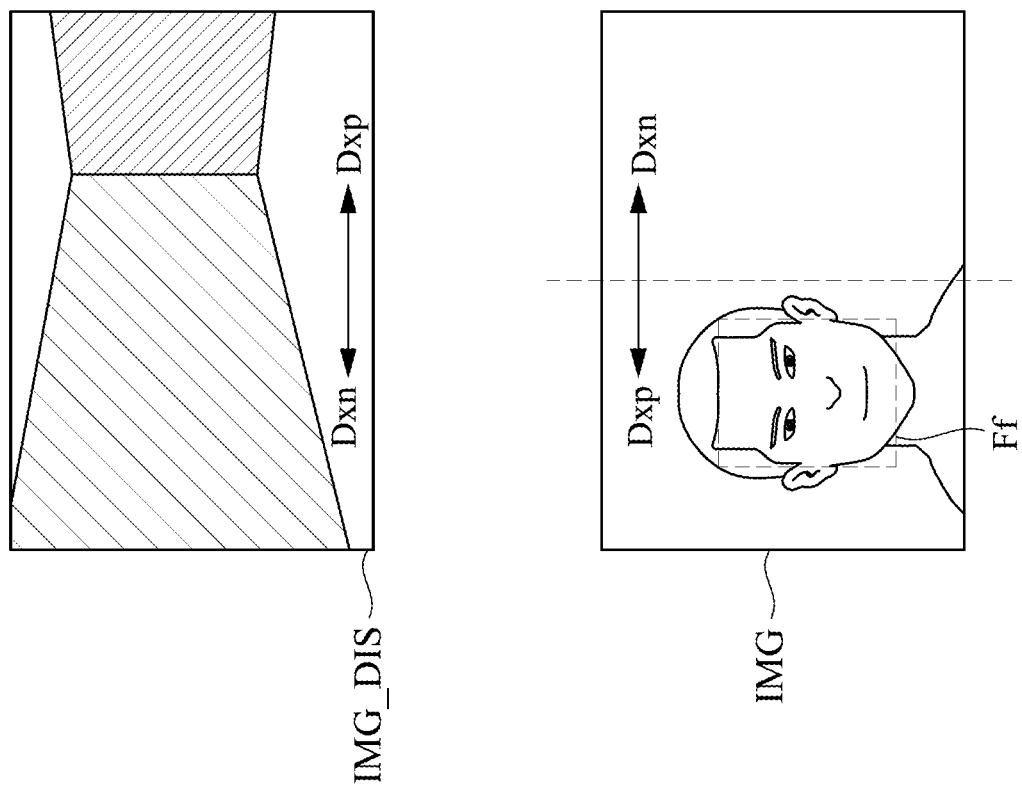

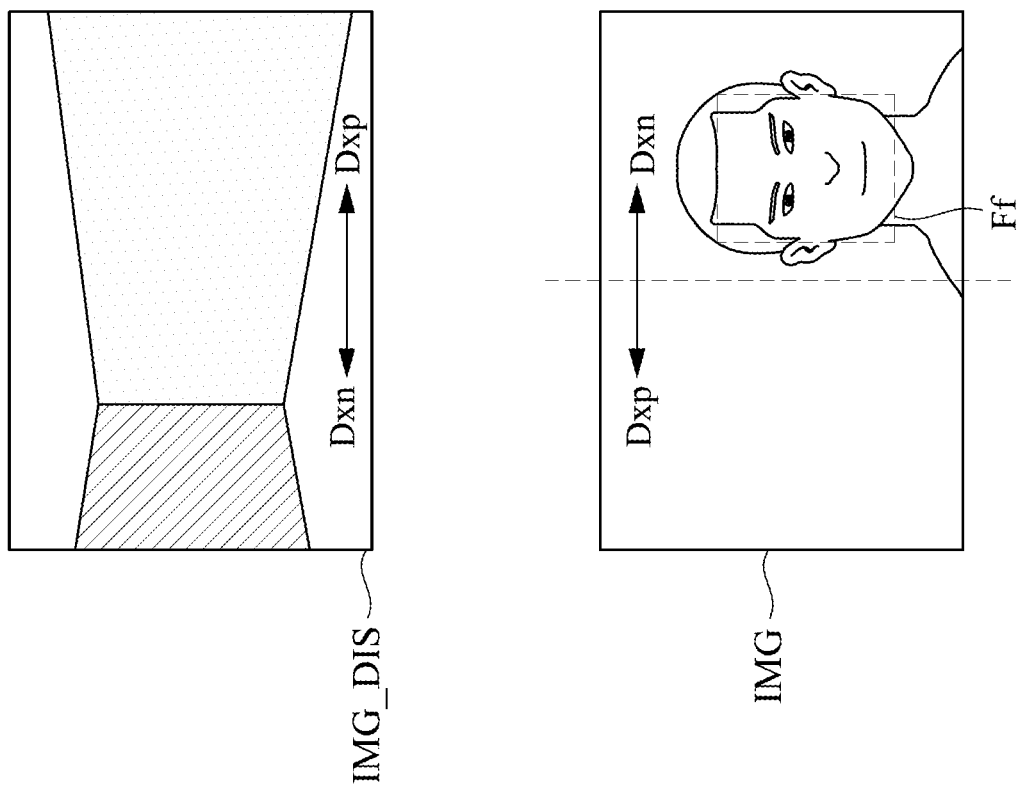

IMAGE PROCESSING METHOD AND ELECTRONIC DEVICE

CROSS-REFERENCE TO RELATED APPLICATION

This application claims priority to China Application Serial Number 202211340358.X, filed Oct. 28, 2022, which is herein incorporated by reference in its entirety.

BACKGROUND

Technical Field

The present invention relates to an image processing method. More particularly, the present invention relates to an image processing method for a virtual scene and an electronic device thereof.

Description of Related Art

Nowadays, the number of people being advised to work remotely is dramatically increased, which then sparked the importance of remote collaboration, such that many practitioners realized the benefit of remote collaboration. This collaboration setup is highly sought after for many reasons, one of which involves the situation where collaborators no longer need to spend hours or days traveling and physically meet each other; instead, they can reliably communicate and collaborate in the virtual world.

However, these benefits of remote collaboration are overshadowed by their limitations. Collaborators must have specific equipment to collaborate effectively with others in the virtual world. For example, it needs to utilize VR headsets which are often paired with a set of joysticks equipped with tracking sensors to track the head movements.

Moreover, the virtual applications would require a reasonably powerful computing device to ensure comfort. Based on the above issues, there is a substantial gap exists between collaborators joining from real and virtual worlds.

Therefore, how to reduce the requirement for utilizing the specific equipment to detect the head pose and ensure the collaborators in an easy and immersive collaboration system is an importance issue in this field.

SUMMARY

The present disclosure provides an aspect of the present disclosure relates to an image processing method. The image processing method includes the following steps. A plurality of facial landmarks of a face frame are analyzed. A feature width is calculated according to the facial landmarks, and a head pose is analyzed according to the facial landmarks. The feature width updated according to the head pose to generate an updated feature width. A scale ratio of the updated feature width to an initial width is calculated. An object distance of a virtual camera in a virtual scene is controlled according to the scale ratio. A two-dimensional image is captured according to the object distance.

The present disclosure provides an aspect of the present disclosure relates to an electronic device. The electronic device includes an image sensor a processor and a display. The image sensor is configured to capture an image. The processor is electrically coupled to the image sensor, and the processor is configured to perform the following steps. A plurality of facial landmarks of a face frame is analyzed. A feature width is calculated according to the facial landmarks, and a head pose is analyzed according to the facial landmarks. The feature width is updated according to the head pose to generate an updated feature width. A scale ratio of the updated feature width to an initial width is calculated. An object distance of a virtual camera in a virtual scene is controlled according to the scale ratio. A two-dimensional image is captured according to the object distance. The display is electrically coupled to the processor, and the display is configured to display the two-dimensional image.

Summary, the image processing method and the electronic device of the present disclosure controls the virtual camera by analyzing the face frame in the two-dimensional image, and converted the three-dimensional virtual scene to the two-dimensional image according to the field of view of the virtual camera, so as to provide the immersive experience in video conference, selfie image, scenery presentation or other interactive image processing techniques to the user.

BRIEF DESCRIPTION OF THE DRAWINGS

FIGS. 10A-10B shows a virtual camera in a virtual scene according to some embodiments of the present disclosure.

FIGS. 12A-12C shows a movement of a user in an image captured by an image sensor and a video image displayed by a display.

DETAILED DESCRIPTION

The terms used in this specification generally have their ordinary meanings in the art. The above vocabulary is defined in the commonly used dictionary, and any examples of the use of the vocabulary discussed herein are included in the description of the specification, and are not intended to limit the scope and meaning of the disclosure. Likewise, the disclosure is not limited to various embodiments given in this specification.

The terms "comprises", "includes", etc., as used herein, are all open terms, meaning "including but not limited to". Further, "and/or" as used herein includes any one or combination of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
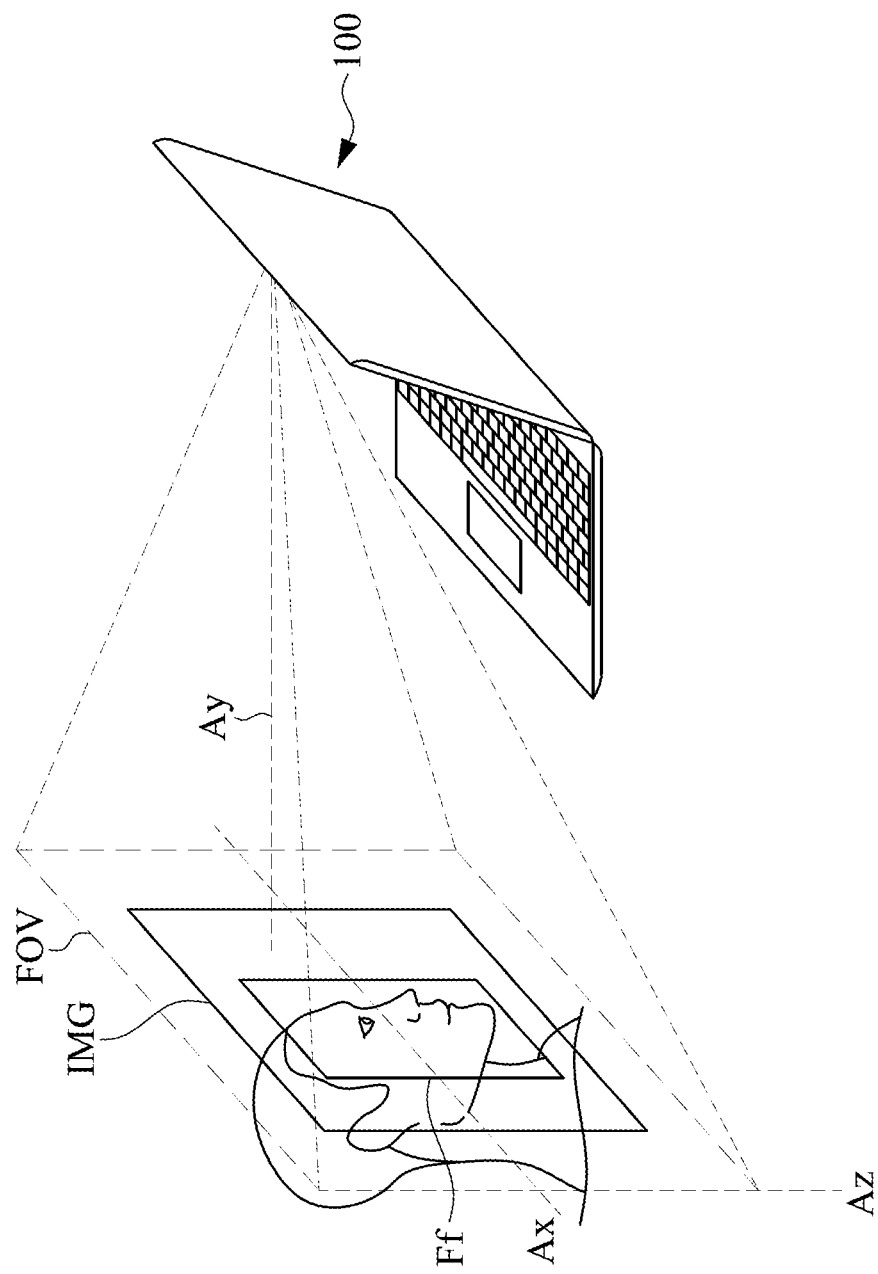
FIG. 1 shows a schematic diagram of an electronic device for capturing an image according to some embodiments of the present disclosure.
Figure 2:
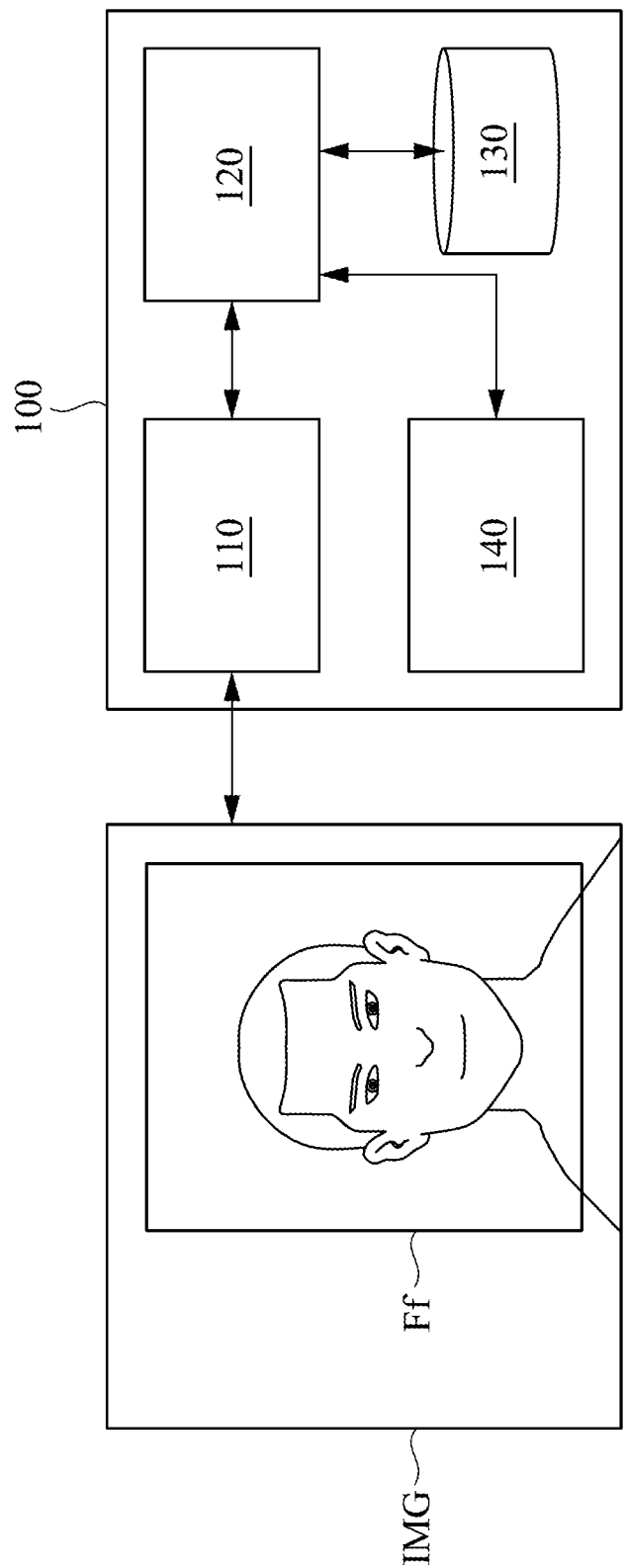
FIG. 2 shows a schematic diagram of an electronic device according to some embodiments of the present disclosure.

Referring to FIGS. 1-2, FIG. 1 shows a schematic diagram of an electronic device 100 for capturing an image IMG according to some embodiments of the present disclosure. FIG. 2 shows a schematic diagram of an electronic device 100 according to some embodiments of the present disclosure. In some embodiments, the electronic device 100 can be implemented by a personal computer, a panel, a smart phone or other electronic devices equipped with computing functions and at least one image sensor. In some embodiments, the electronic device includes an image sensor 110, a processor 120, a memory 130 and a display 140.

In some embodiments, the present disclosure utilizes widely deployed webcams to capture the video data from collaborators, and enhance the immersive experience by mapping movements of collaborators' heads into a virtual world. To achieve this, the present disclosure utilizes a neural network model for face feature detection to estimate user's head poses from webcam images. The estimated head poses can then be associated with movements of the virtual camera to reduce the gap between the events happening in the real and virtual worlds, leading to a more immersive user experience without additional capturing devices or sensors.

That is, the laptop, the smart phone, the panel or other electronic device with computing, displaying and image sensing function can be operated as a portal or window to the virtual world, by rendering the 3D virtual world for collaboration.

In some embodiments, the electronic device 100 is utilized to interact with the virtual world to reduce the need to wear a headset for detecting the head pose of user. The embodiments in the present disclosure enable a 3D viewing experience on a conventional laptop or computer display, without the need of a VR/AR headset.

In some embodiments, the electronic device 100 is operated as an interface to interact with the virtual scene, in order to reduce the requirement of the head-mounted device for detecting the head pose, and realize the viewing experience of 3D scenes on the display of general-purpose electronic devices (e.g., general laptops, mobile phones, computers) instead of utilizing the head-mounted device (head-mounted display) with augmented reality functions.

In some embodiments, the electronic device 100 in the present disclosure can be cooperated with the virtual reality techniques or the augmented reality techniques. Therefore, it is not intend to limit the present disclosure.

The processor 120 can be implemented by a central processing unit, microprocessor, graphic processing unit, field-programmable gate array (FPGA), application specific integrated circuit (ASIC) or other hardware device/element/circuit capable for accessing or executing instructions or data stored in the memory 130. The memory 130 can be implemented by an electric memory device, a magnetic memory device, an optical memory device or other memory devices capable for storing or executing instructions or data.

In some embodiments, the memory 130 can be implemented by a volatile memory or a non-volatile memory. In some embodiments, the memory 130 can be implemented by random access memory (RAM), dynamic random access memory (DRAM), magnetoresistive random access memory (MRAM), phase-change random access memory (PCRAM) or other memory devices. The memory 130 is configured to store data and/or instruments/commands for processor 120 to access and operate.

The image sensor 110 can be implemented by a complementary metal oxide semiconductor image sensor (CMOS image sensor), a charge-coupled device image sensor (CCD image sensor) or other light sensing component or light sensing device. The image sensor 110 is electrically coupled to the processor 120.

The image sensor 110 of the electronic device 100 is configured to capture an image IMG.

Meanwhile, if a user enters a field of view FOV of the image sensor 110, the electronic device 100 utilizes a neural network to detect a face frame from the image IMG captured by the image sensor 110, and the electronic device 100 analyzes a depth variation along an axis Ay and a displacement on a vertical plane vertical to the axis Ay of the user's face in the image IMG, such that the electronic device 100 adjusts the display image displayed by the display 140 according to the depth variation and the displacement on the vertical plane of the user's face. How to analyze the depth variation and the displacement of the user's face, by the processor 120, in order to adjust the display image displayed by the display 140 will be described in detail in the following embodiments.

Figure 3:
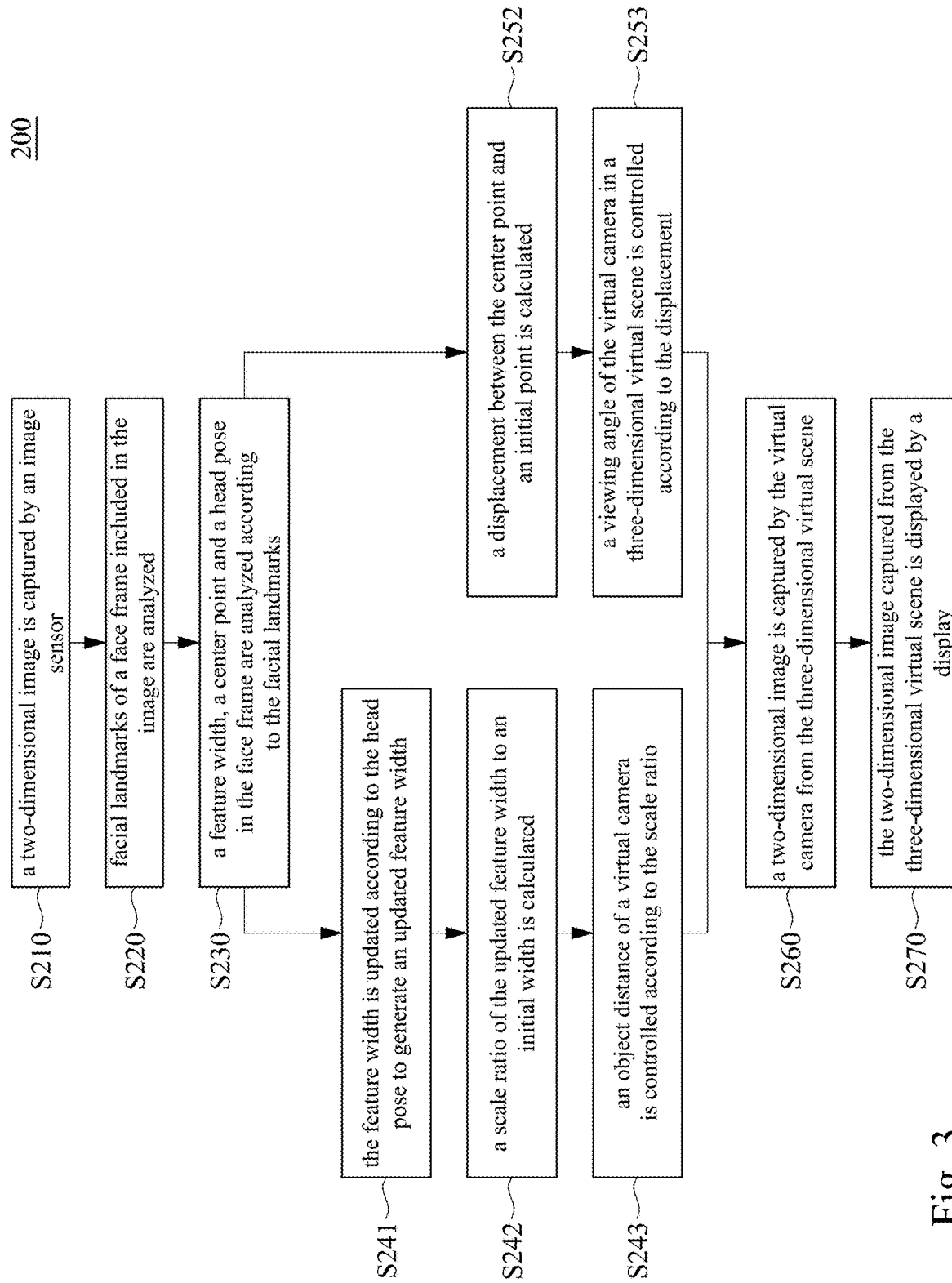
FIG. 3 shows a schematic diagram of a flowing chart of an image processing method according to some embodiments of the present disclosure.
Figures 4, 5:
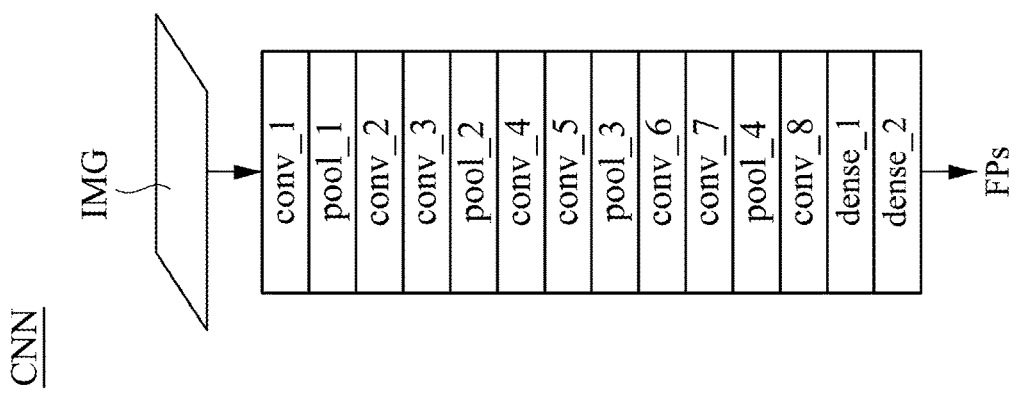
FIG. 4 shows a schematic diagram of a convolutional neural network according to some embodiments of the present disclosure.
FIG. 5 shows a specification of the convolutional neural network in FIG. 4 according to some embodiments of the present disclosure.
Figure 7:
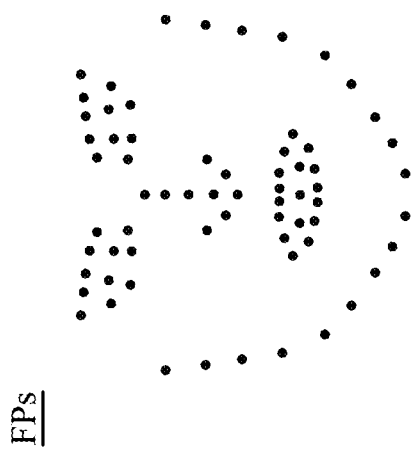
FIG. 7 shows facial landmarks of a face frame in the FIG. 1 according to some embodiments of the present disclosure.
Figure 6:
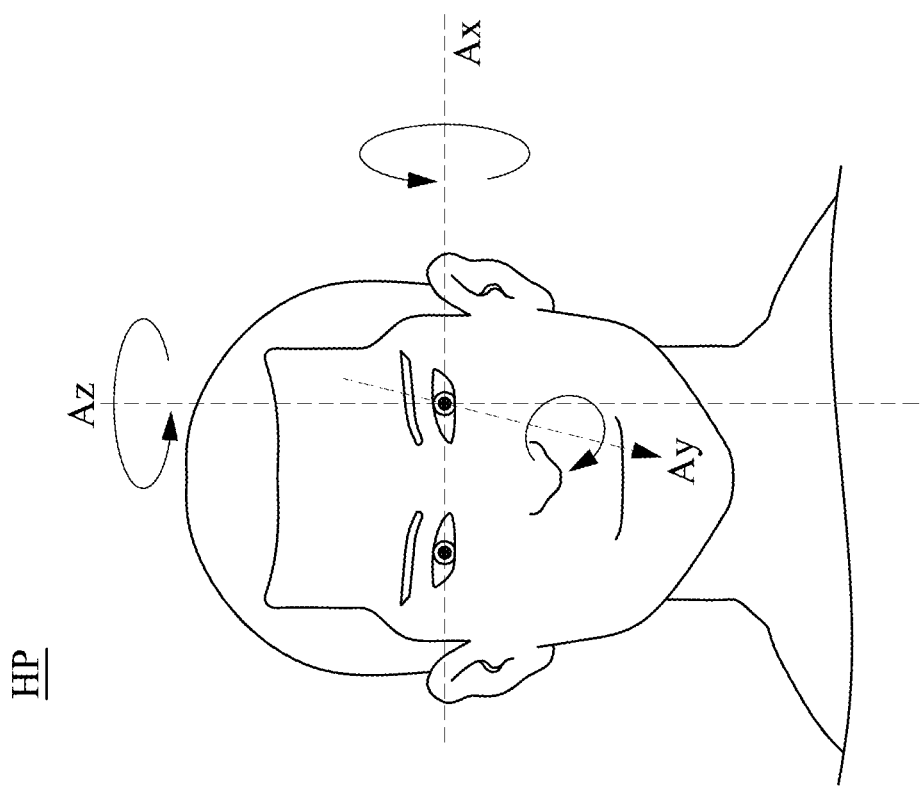
FIG. 6 shows a schematic diagram of a head pose of a user according to some embodiments of the present disclosure.
Figure 8:
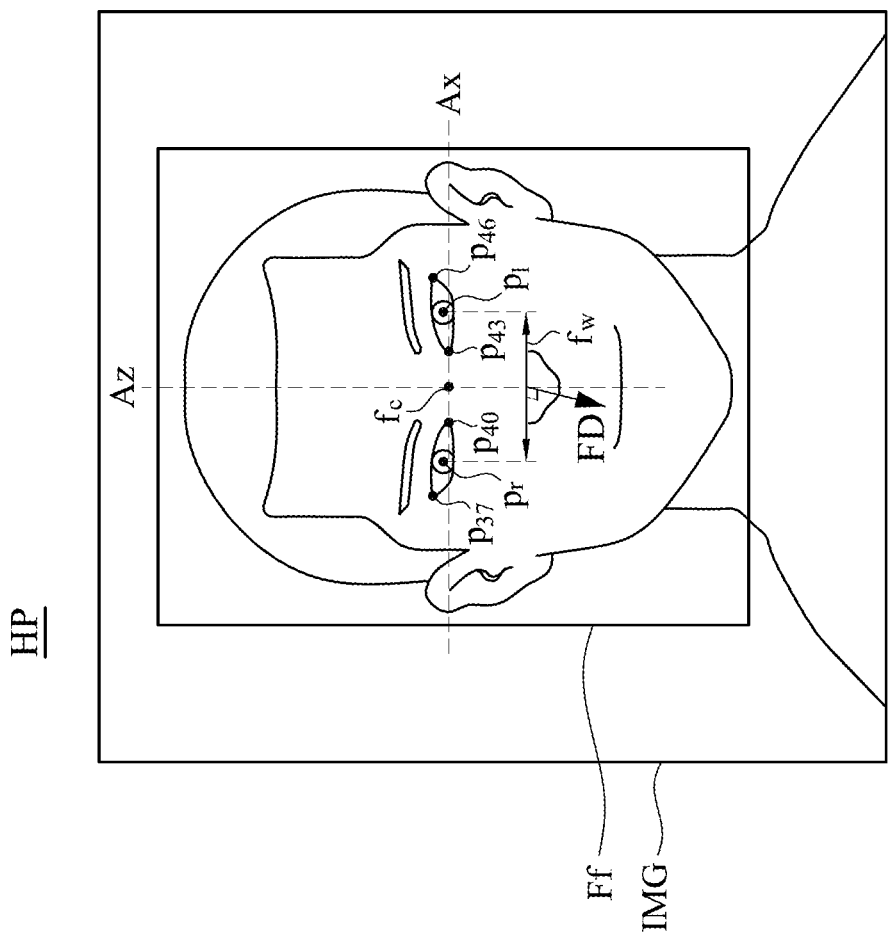
FIG. 8 shows a center point and a feature width of a user's face in a face frame according to some embodiments of the present disclosure.
Figure 9B:
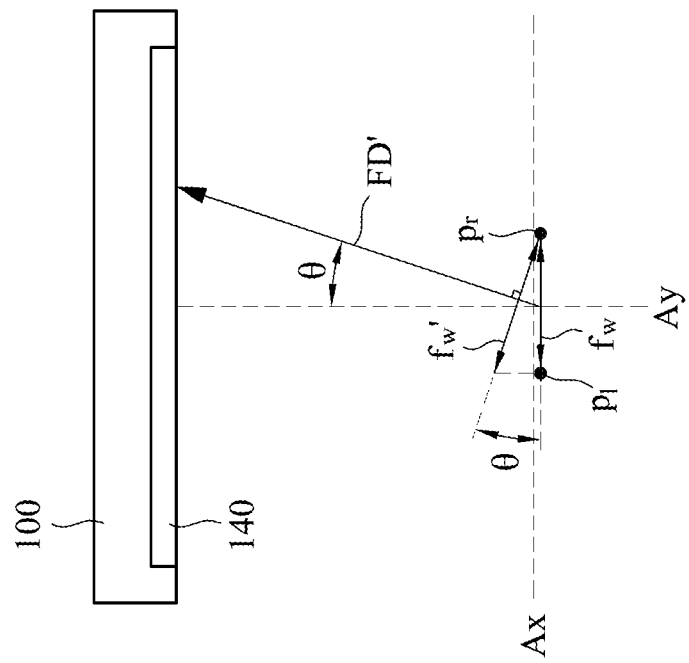
FIGS. 9A-9B shows a feature width of a user's face in a face frame and an updated width according to some embodiments of the present disclosure.
Figure 9A:
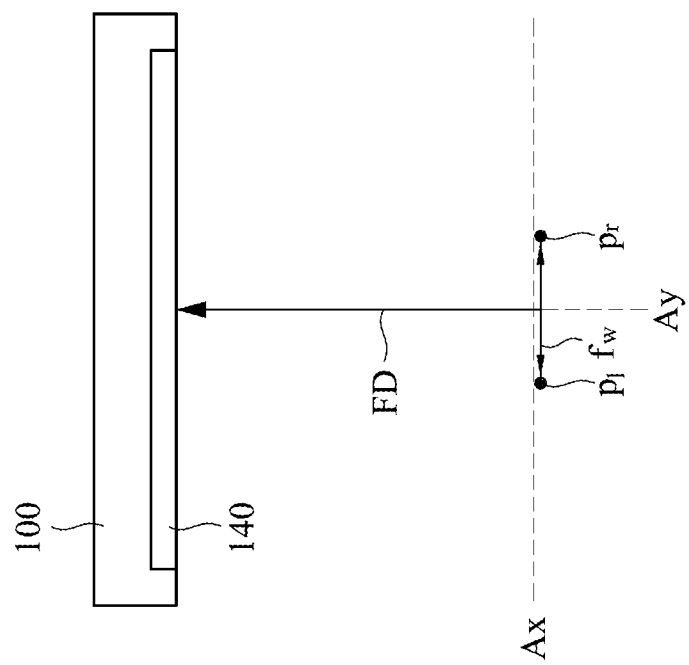

Reference is made to FIGS. 1-10B. FIG. 3 shows a schematic diagram of a flowing chart of an image processing method 200 according to some embodiments of the present disclosure. FIG. 4 shows a schematic diagram of a convolutional neural network CNN according to some embodiments of the present disclosure. FIG. 5 shows a specification of the convolutional neural network CNN in FIG. 4 according to some embodiments of the present disclosure. FIG. 6 shows a schematic diagram of a head pose HP of a user according to some embodiments of the present disclosure. FIG. 7 shows facial landmarks FPs of a face frame Ff in the FIG. 1 according to some embodiments of the present disclosure. FIG. 8 shows a center point $f_c$ and a feature width $f_w$ of a user's face in a face frame according to some embodiments of the present disclosure. FIGS. 9A-9B show a feature width $f_w$ of a user's face in a face frame and an updated width $f_w'$ according to some embodiments of the present disclosure. FIGS. 10A-10B shows a virtual camera VCA in a virtual scene VIR according to some embodiments of the present disclosure.

As shown in FIG. 3, the image processing method 200 includes steps S210~S270, wherein, the step S2110 can be performed by an image sensor 110. Step S270 can be performed by a display 140. Steps S220~S260 can be performed by a processor 120.

In step S210, a two-dimensional image is captured by an image sensor 110, as shown in FIG. 1. Meanwhile, if a user moves into a field of view FOV of the image sensor 110, the electronic device 100 utilizes a neural network to detect a face frame Ff in the image IMG captured from the image sensor 110.

In step S220, facial landmarks of a face frame included in the image IMG are analyzed. In some embodiments, the processor 120 utilizes a facial landmark neural network model CNN to analyze facial landmark FPs included in the face frame Ff of the image IMG. In some embodiments, the facial landmark neural network model CNN can be implemented by a convolutional neural network architecture, the said convolutional neural network architecture includes 8 convolution layers cov_1~cov_8, 2 fully connection layers dense_1~dense_2 and 4 pooling layers pool_1~pool_4. In some embodiments, the image IMG is the input of the said convolutional neural network architecture. And, for one face frame Ff, the said convolutional neural network architecture outputs 68 facial landmarks, each of the facial landmarks is expressed in a form of (x,z), as shown in FIGS. 4, 5 and 7.

In step S230, a feature width $f_w$, a center point $f_c$ and a head pose HP in the face frame Ff are analyzed according to the facial landmarks FPs. In some embodiments, the center point $f_c$ can be implemented by a center of both eyes, and the feature width $f_w$ can be implemented by an interpupillary distance. In other embodiments, the feature width $f_w$ can be implemented by an inner canthal width, an outer canthal width, a palpebral fissure length, a face width, a jaw width, mouth width, or a nose width in the face frame Ff by calculating the other part of the facial landmarks FPs. Therefore, it is not intended to limit the present disclosure.

For example, if the center point $f_c$ of a face is implemented by a center of both eyes, and the feature width $f_w$ is implemented by an interpupillary distance, the processor 120 obtains positions $p_{43}$ and $p_{46}$ at the inner and outer corners of the left eye and positions $p_{37}$ and $p_{40}$ at the inner and outer corners of the right eye form the facial landmarks FPs.

The processor 120 averages the positions $p_{43}$ and $p_{46}$ at the inner and outer corners of the left eye as a left eye position pi, and the processor 120 averages the positions $p_{37}$ and $p_{40}$ at the inner and outer corners of the right eye as a right eye position $p_r$, as expressed in the following formulas.

$$p_r=(p_{37}+p_{40})/2$$

$$p_l=(p_{43}+p_{46})/2$$

The processor 120 averages the left eye position $p_l$ and the right eye position $p_r$ as the center point $f_c$ of the face, and the processor 120 calculates a difference between the left eye position pi and the right eye position $p_r$ as the feature width $f_w$, as expressed in the following formulas.

$$f_c=(p_l+p_r)/2$$

$$f_w=|p_l[0]-p_r[0]|$$

And, the processor 120 calculates a displacement $d_f$ of an initial point to the center point $f_c$ on a two-dimensional plane and a scale ratio $r_f$ of the feature width $f_w$ in respect to an initial width, as expressed in the following formulas.

$$d_f=f_c-f_{c,0}$$

$$r_f=f_w/f_{w,0}$$

In the above formulas, $f_{c,0}$ is expressed as the initial point, and the $f_{w,0}$ is expressed as the initial width.

As a result, if a user is closer to the electronic device 100, the user's face becomes larger in the image IMG captured by the image sensor 110. On the other hand, if a user is away from the electronic device 100, the user's face becomes smaller in the image IMG captured by the image sensor 110. Therefore, a variation of the depth/distance between the user and the electronic device 100 can be analyzed and determined according to the scale ratio $r_f$ of the feature width $f_w$ in the face frame Ff.

In some embodiments, if the user does not approach to the electronic device 100, and there is a yaw rotation of the user's head pose HP around a yaw axis (such as, a vertical axis of Az). Meanwhile, the image sensor 110 may capture a side view of the user's face, causing the feature width $f_w$ calculated from the distance between both of user's eyes becomes smaller.

Therefore, the step S240 is performed, the feature width $f_w$ is updated according to the head pose HP to generate an updated feature width $f_w'$, in order to utilize the updated feature width $f_w'$ to determine an accurate variation of the depth/distance between the user and the electronic device 100.

Specifically, the processor 120 utilize the neural network model to analyze variations of vectors among in the facial feature points FPs to analyze the head pose HP and the face direction FD of the user. And, a yaw rotation of the user's head pose HP around the vertical axis is converted into a rotation angle θ of a face direction FD in respect to the axis Ay on a horizontal plane, wherein the angle θ is in a range of +90 degrees to -90 degrees.

The processor 120 calibrates/updates the feature width $f_w$ in the face frame Ff according to the angle θ of a movement of the user's head pose HP around the vertical axis (such as, the Az axis) to generate an updated width $f_w'$, the updated width $f_w'$ can be expressed in the following.

$$f_w'=f_w/\cos\theta$$

As a result, the updated width $f_w'$ is utilized for the following calculation, so as to accurately determine the distance of the electronic device 100 along the axis Ay to the user. The processor 120 calculates the a scale ratio of the updated width $f_w'$ to the initial width $f_{w,0}$, the said scale ratio is expressed as $r_f'$ as the following formula.

$$r_f'=f_w'/f_{w,0}$$

In step S243, an object distance of a virtual camera VCA is controlled according to the scale ratio $r_f'$. If the scale ratio $r_f'$ is increased (or more than 1), this represents that the user's face is relatively close to the electronic device 100, and processor 120 controls the virtual camera VCA to be close to a fixed point VP, such that an object distance (or a field of view) of the virtual camera VCA is reduced, so as to focus on a local area in the virtual scene VIR, as shown in FIG. 10A. On the other hand, if the scale ratio $r_f'$ is decreased (or less than 1), this represents that the user's face is relatively away from the electronic device 100, and the processor 120 controls the virtual camera VCA to be away from the fixed point VP, such that the object distance (or the field of view) of the virtual camera VCA is increased, as shown in FIG. 10B.

To be noted that, the virtual scene VIR can be implemented by a three-dimensional virtual scene. In other embodiments, the virtual scene VIR can be implemented by a two-dimensional virtual scene. Therefore, it is not intend to limit the present disclosure.

In some embodiments, the processor 120 can perform the difference calculation with smoothing on the scale ratio $r_f'$, and controls the object distance of the virtual camera VCA in the virtual scene VIR according to the calculated result.

A side movement of the virtual camera VCA and a rotation pose the virtual camera VCA is decided by a center point $f_c$ of the face frame Ff, which will be discussed in the following embodiments.

Figure 11A:
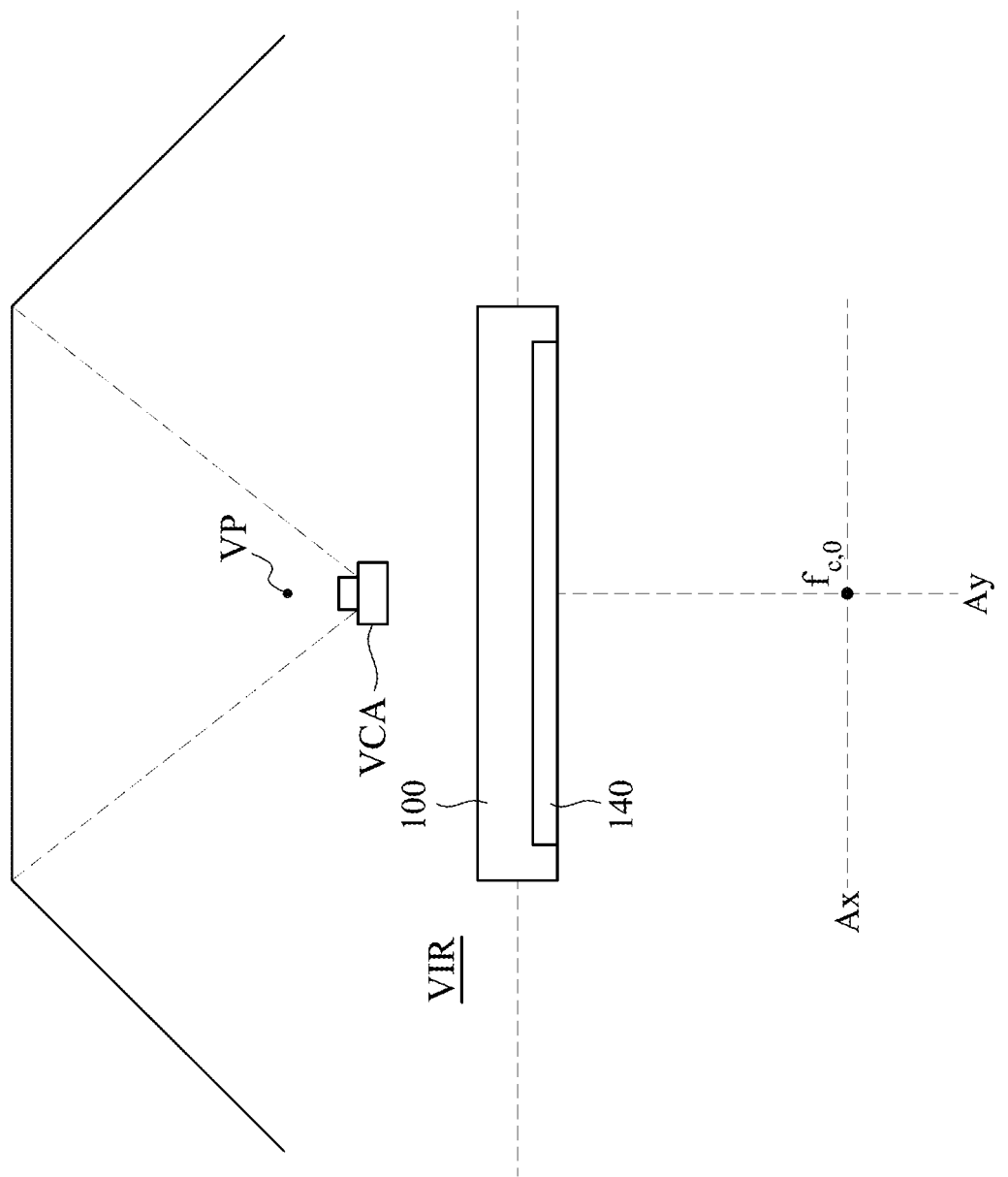
FIGS. 11A-11C shows a displacement of a center point of a user's face in respect to an electronic device being mapped into a pose and a displacement of a virtual camera in a virtual scene according to some embodiments of the present disclosure.
Figure 11B:
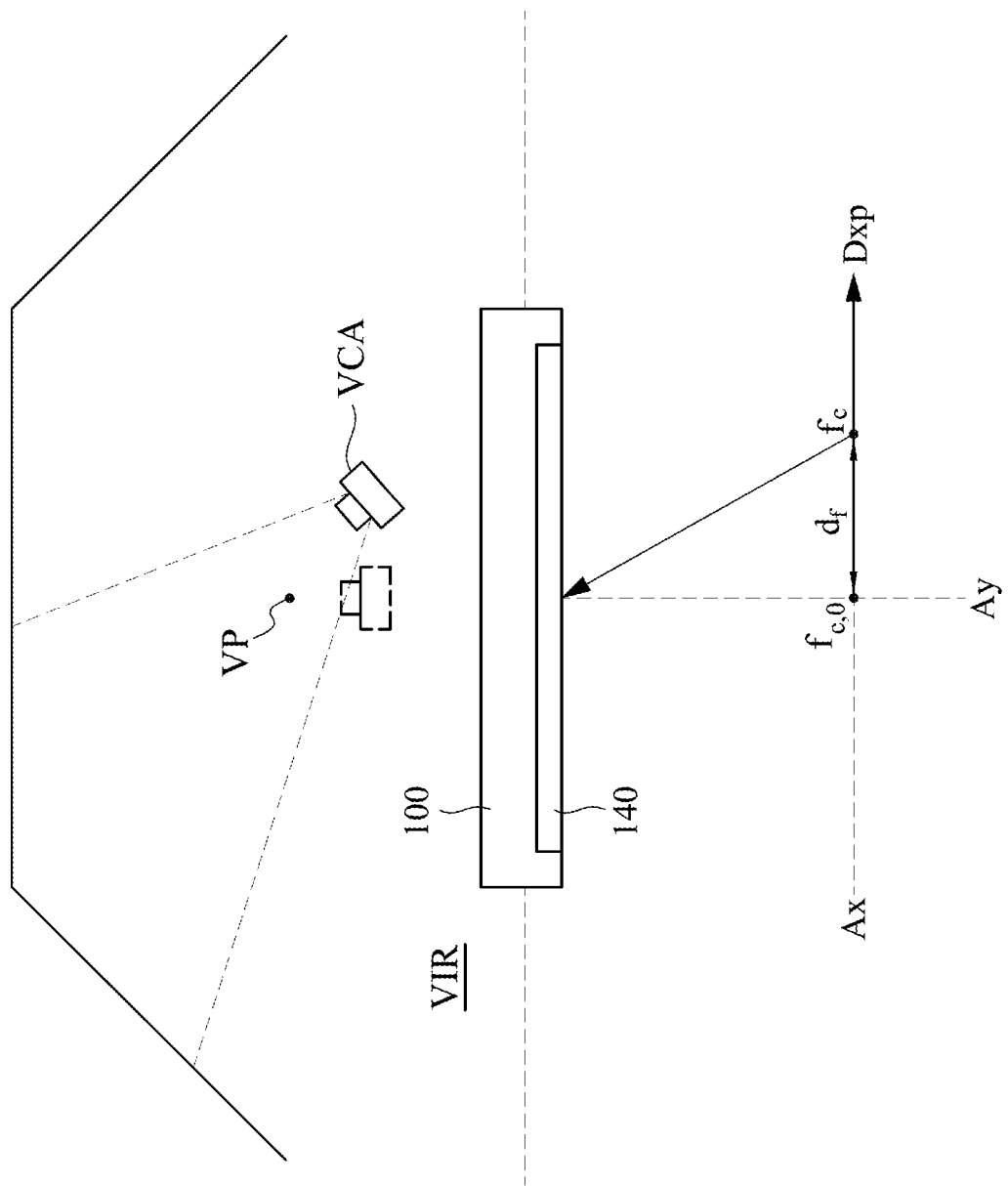
Figure 11C:
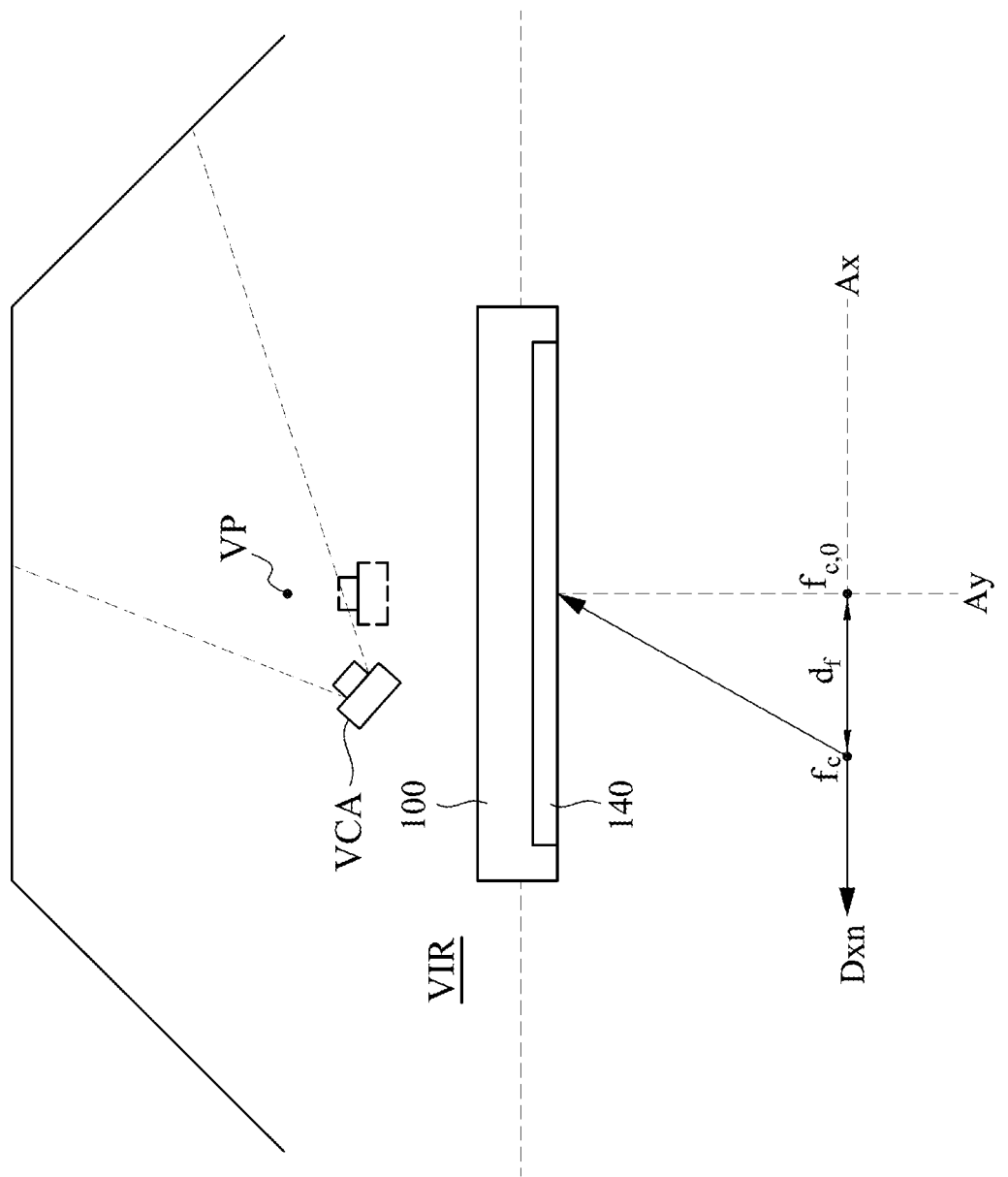

For better understand, reference is made to FIGS. 1~3, 8 and 11A~11C. FIGS. 11A-11C shows a displacement $d_f$ of a center point $f_c$ of a user's face in respect to an electronic device 100 being mapped into a pose and a displacement of a virtual camera VCA in a virtual scene VIR according to some embodiments of the present disclosure.

In step S252, a displacement $d_f$ between the center point $f_c$ and an initial point $f_{c,0}$ is calculated. In some embodiments, a setting process for the initial point $f_{c,0}$ can be complete in a set up stage. For example, after the electronic device 100 operated in the set up stage, the electronic device 100 reminds the user to prepare for setting the initial point $f_{c,0}$. When the user's face moves to a most suitable distance to the electronic device 100, the electronic device 100 captures an image at the moment, and calculates a center point of the face in the image as the initial point $f_{c,0}$, as shown in FIG. 11A.

In step S253, a viewing angle of the virtual camera VCA in a three-dimensional virtual scene VIR is controlled according to the displacement $d_f$. The processor 120 moves the virtual camera VCA along a curved plane which is established based on a fixed point VP, so as to adjust the viewing angle of the virtual camera VCA in the virtual scene VIR.

For example, if a center point $f_c$ of the face frame Ff is moved in a direction Dxp, the virtual camera VCA is controlled to be moved in the direction Dxp and the viewing angle of the virtual camera VCA is rotated in a counter-clockwise direction in respect to the fixed point VP, so as to adjust the viewing angle of the virtual camera VCA in the virtual scene VIR, as shown in FIG. 11B.

On the other hand, if a center point $f_c$ of the face frame Ff is moved in a direction Dxn, the virtual camera VCA is controlled to be moved in the direction Dxn and the viewing angle of the virtual camera VCA is rotated in a clockwise direction in respect to the fixed point VP, so as to adjust the viewing angle of the virtual camera VCA in the virtual scene VIR, as shown in FIG. 11C.

To be noted that, the processor 120 can perform the difference calculation with smoothing on the displacement $d_f$ of the center point $f_c$, and the processor 120 can control the viewing angle of the virtual camera VCA in the virtual scene VIR according to the calculated result.

In the embodiments of FIGS. 11B and 11C, the center point $f_c$ of the face is moved along an axis Ax. In some embodiments, the center point $f_c$ of the face can moved on a vertical plane formed by the axis Ax and Az. Control manner for controlling the viewing angle of the virtual camera VCA according to a displacement of the center point $f_c$ moved along an axis Az is similar with the aforesaid steps for controlling the viewing angle of the virtual camera VCA according to a displacement of the center point $f_c$ moved along an axis Ax, thus the description is omitted here.

In step S260, a two-dimensional image is captured by the virtual camera VCA from the three-dimensional virtual scene VIR. The processor 120 utilizes a three-dimensional to two-dimensional rendering engine to capture a two-dimensional image from the virtual scene VIR according to the aforesaid object distance and viewing angle of the virtual camera VCA.

In step S270, the two-dimensional image captured from the three-dimensional virtual scene VIR is displayed by a display 140. In some embodiments, when the field of view of the virtual camera VCA is decreased, the image captured by the virtual camera VCA can be enlarged to a size corresponding to the display area of the display 140. As a result, the user can focus on the local area more clearly. In some embodiments, when the field of view of the virtual camera VCA is increased, the image captured by the virtual camera VCA can be narrowed to a size corresponding to the display area of the display 140, so as to focus on the global area.

Figure 12B:
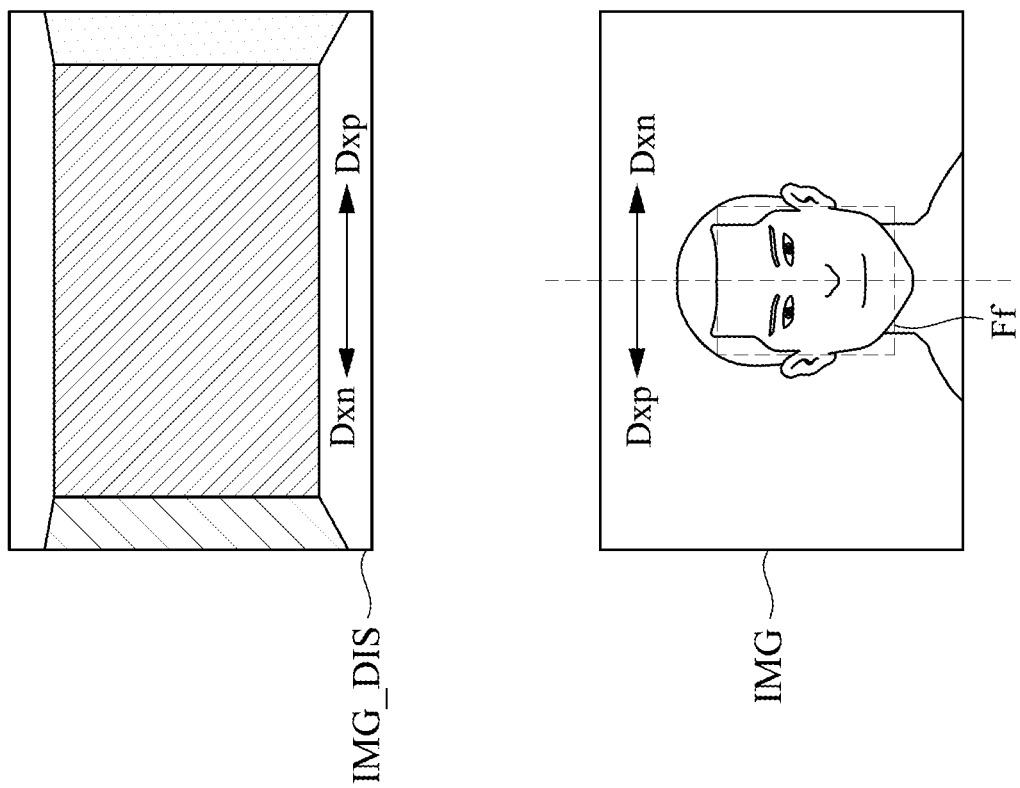

Reference is made to FIGS. 12A to 12C. FIGS. 12A-12C shows a movement of a user in an image IMG captured by an image sensor 110 and a video image IMG_DIS displayed by a display 140.

As shown in FIG. 12A, when the user moves to the right in the actual environment (the user captured in the image IMG is relatively moves to left due to the mirror image of the front camera), the virtual camera VCA is controlled to be moved to the right and rotates counterclockwise to capture an image in the left space of the virtual scene VIR.

As shown in FIG. 12B, when the user without any displacement in respect to the initial point $f_{c,0}$, the virtual camera VCA is controlled to capture an image in the central space of the virtual scene VIR.

As shown in FIG. 12C, when the user moves to the left in the actual environment (the user captured in the image IMG is relatively moves to right due to the mirror image of the front camera), the virtual camera VCA is controlled to be moved to the left and rotates anticlockwise to capture an image in the right space of the virtual scene VIR.

Summary, the electronic device 100 and the image processing method 200 of the present disclosure controls the object distance and the viewing angle of the virtual camera VCA by analyzing the face position in the two-dimensional image, and converted the three-dimensional virtual scene to the two-dimensional image according to the field of view of the virtual camera VCA, so as to provide the immersive experience in video conference, selfie image, scenery presentation or other interactive image processing techniques to the user.

Although the present disclosure has been disclosed in the above embodiments, but it is not limited thereto. Anyone who is familiar with this skill can make various changes and refinements without departing from the spirit and scope of this disclosure. Therefore, the scope of protection of this disclosure is subject to the definition of the scope of the patent application attached.

What is claimed is:

1. An image processing method, comprising:
analyzing a plurality of facial landmarks of a face frame;
calculating a feature width according to the plurality of facial landmarks, and analyzing a head pose according to the plurality of facial landmarks;
updating the feature width according to the head pose to generate an updated feature width;
calculating a scale ratio of the updated feature width to an initial width;
controlling an object distance of a virtual camera in a virtual scene according to the scale ratio; and
capturing a two-dimensional image according to the object distance.

2. The image processing method of claim 1, wherein the feature width is an inner canthal width, an interpupillary distance, an outer canthal width, a palpebral fissure length, a face width, a jaw width, mouth width, or a nose width.

3. The image processing method of claim 1, further comprising:

calculating a rotation angle of a face direction comprised in the head pose in respective to an axis on a horizontal pane; and updating the feature width according to the rotation angle of the face direction in respective to the axis to generate the updated feature width.

4. The image processing method of claim 1, further comprising:

controlling the virtual camera to be close to or away from the a fixed point, according to the scale ratio of the updated feature width to an initial width, to adjust the object distance of the virtual camera in the virtual scene.

5. The image processing method of claim 1, wherein the step of controlling the object distance of the virtual camera comprising:

extending the object distance of the virtual camera in the virtual scene if the scale ratio is decreased; or decreasing the object distance of the virtual camera in the virtual scene if the scale ratio is increased.

6. The image processing method of claim 1, further comprising:

analyzing a center point and the feature width among in the plurality of facial landmarks;

calculating a displacement between the center point and an initial point;

controlling a viewing angle of the virtual camera in the virtual scene according to the displacement; and capturing the two-dimensional image from the virtual scene according to the viewing angle and the object distance of the virtual camera.

7. The image processing method of claim 6, further comprising:

moving the virtual camera along a curved surface in respect to a fixed point, according to the displacement between the center point and the initial point, to adjust the viewing angle of the virtual camera in the virtual scene.

8. The image processing method of claim 6, wherein the center point is a center of eyes in the face frame, and wherein the feature width is a distance between the eyes, wherein the image processing method further comprising:

obtaining positions of inner and outer corners of left eye and right eye;

averaging the positions of the inner and outer corners of the left eye as a left eye position;

averaging the positions of the inner and outer corners of the right eye as a right eye position; and averaging the left eye position and the right eye position as the center point.

9. The image processing method of claim 8, further comprising:

calculating a difference between the left eye position and the right eye position as the feature width.

10. An electronic device, comprising:

an image sensor, configured to capture an image;

a processor, electrically coupled to the image sensor, wherein the processor is configured to:

analyzing a plurality of facial landmarks of a face frame;

calculating a feature width according to the plurality of facial landmarks, and analyzing a head pose according to the plurality of facial landmarks;

updating the feature width according to the head pose to generate an updated feature width;

calculating a scale ratio of the updated feature width to an initial width;

controlling an object distance of a virtual camera in a virtual scene according to the scale ratio; and capturing a two-dimensional image according to the object distance; and a display, electrically coupled to the processor, configured to display the two-dimensional image.

* * * * *